Dec. 16, 1969   A. VONK   3,484,287
PROCESS FOR HYDROLYZING STARCH
Filed Aug. 25, 1967
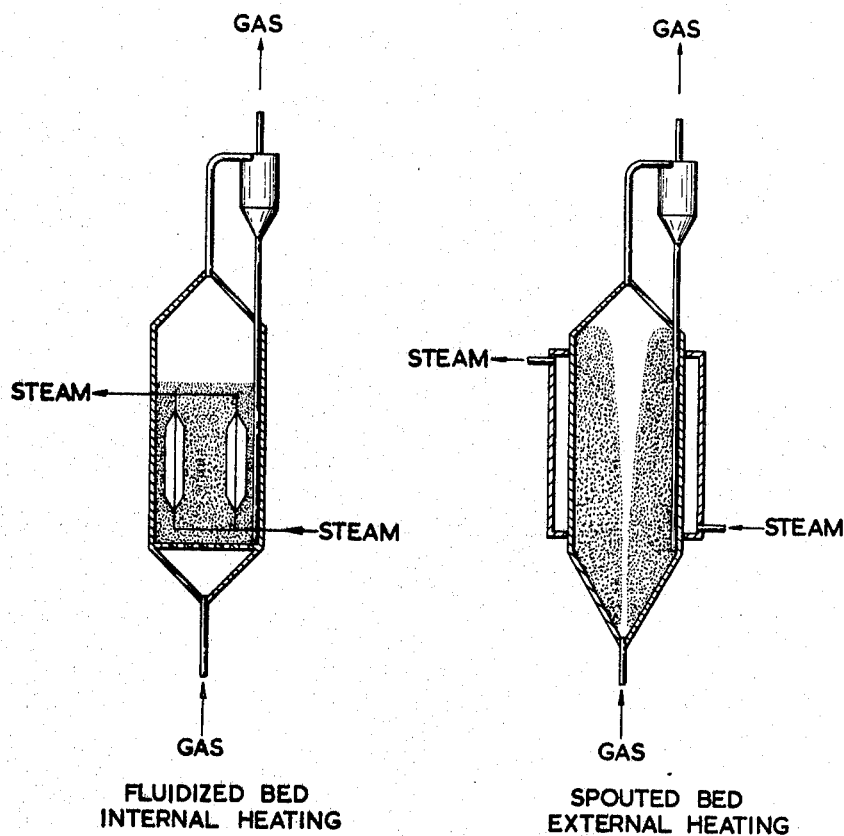
FLUIDIZED BED
INTERNAL HEATING
SPOUTED BED
EXTERNAL HEATING
Abraham Vonk,
INVENTOR.
BY Wendroth, Lind
and Ponack, Attys.

United States Patent Office 3,484,287
Patented Dec. 16, 1969

3,484,287
PROCESS FOR HYDROLYZING STARCH
Abraham Vonk, Hoogezand, Netherlands, assignor to W. A. Scholten's Chemische Fabrieken N.V., Groningen, Netherlands, a corporation of the Netherlands
Filed Aug. 25, 1967, Ser. No. 663,408
Claims priority, application Japan, Aug. 31, 1966, 41/57,855
Int. Cl. C13k 1/06; C13l 1/00
U.S. Cl. 127—38                    18 Claims

ABSTRACT OF THE DISCLOSURE

Preparation of uniform, lightly colored starch hydrolysis products by impregnating natural or granular modified starch with 0.5–20% (based on the starch) of a non-volatile inorganic acid and 5–50% (based on the starch) of a water soluble amide to form a mixture which does not contain more than 12% water, and heating the mixture at a temperature 80° C.–200° C., while the starch is kept fluidized.

---

This invention relates to the preparation of hydrolysis products of starch by heating starch with non-volatile inorganic acids and organic nitrogen compounds in a substantially dry state.

It is known to hydrolyze starch by incorporating a volatile acid, such as hydrochloric acid or nitric acid, into the starch and heating the mixture in a substantially dry state to temperatures ranging from 80° C. to 200° C.

This process is commonly carried out in pans or drums, the starch being heated in relatively thick layers. If it is tried to hydrolyze starch admixed with nonvolatile inorganic acids, such as phosphoric acid, sulphamic acid, or sulphuric acid, in the same way, difficulties are encountered in that, as a result of irregularities in the distribution of the acid and/or the heating of the mixture, black specks are formed in the starch. If the non-volatile acid is used in combination with organic nitrogen compounds, such as water soluble amides, in order to buffer the acid, a new difficulty is introduced in that, upon heating, reactions occur by which large quantities of ammonia are produced. Consequently, when thick layers of the mixture are heated, the hydrolysis cannot be controlled properly, resulting in products of a widely varying degree of hydrolysis, which are moreover strongly coloured.

It has now been found that these drawbacks may be avoided and that lightly-coloured hydrolysis products are obtained by carrying out the hydrolysis by heating a substantially dry mixture of starch with non-volatile inorganic acids and water-soluble amides in the fluidized state. By the fluidized state we mean the state in which a material consisting of solid particles is kept in turbulence by an upward stream of gas, in such a way that the density of the suspension of the particles in the gas is high and an interface or interfacial zone is perceivable at the top of the turbulent particles. The fluidized mass strongly resembles a boiling, bubbling liquid. The use of such fluidized materials is well known in the art, especially in the mineral oil industry.

The invention provides a process for hydrolyzing starch, which comprises heating an intimate mixture of natural starch or granular modified starches which have been impregnated with 0.5% to 20% (calculated on the starch) of a non-volatile inorganic acid, and 5% to 50% (calculated on the starch) of a water-soluble amide, said mixture containing no more than 12% of moisture, to a temperature ranging from 80° to 200° C., whilst said mixture is kept in the fluidized state by passing a stream of gas through a bed of the mixture at a velocity capable of fluidizing the starch granules. The heating is preferably effected at a temperature between 110° and 140° C.

Suitable starting materials for the new process are all starch products which have the granular form of natural, ungelatinized starch. Examples of the suitable starting materials are cereal starches, such as maize, wheat, rye, rice, waxy maize, and high amylose maize starch, the root starches, such as potato and tapioca starch, stem starches, such as sago starch, and starches modified by a treatment with acid, heat, oxidants, etherifying agents, esterifying agents or acetalizing agents, provided the starch has retained its granular form.

Said starches and granular modified starches have, by nature, a suitable granule size for being fluidized. If the moisture content of the starch is higher than 12%, the fluidization becomes difficult owing to the increased mutual friction between the granules. It is therefore necessary to adjust the moisture content of the starch to below 12% before the fluidization is started. The fluidizability of the starch can be enhanced by the addition of minor quantities (0.1–2%, calculated on the starch) of substances such as tricalcium phosphate, magnesium oxide or colloidal silica.

Suitable non volatile inorganic acids for the novel process are sulphamic acid, sulphuric acid, and acids derived from phosphorus, such as phosphoric acid, pyrophosphoric acid, and polyphosphoric acid. The acids can be used either alone or in the form of mixtures. If the acids are used singly, we preferably add, calculated on the starch as 100% acid, 5–15% of the phosphoric acids, 2–8% of sulphamic acid or 0.5–3% of sulphuric acid. The non-volatile inorganic acids, may also be used in combination with volatile inorganic acids, such as hydrochloric acid or nitric acid, or with organic acids, such as citric acid.

Suitable water-soluble amides are urea, methyl urea, allyl urea, methylol urea, thiourea, acetyl urea, dicyanourea, formamide, butyramide, and acrylamide. The amides can be used alone or in the form of mixtures. We preferably use urea, in a proportion of 5–25%, calculated on the starch.

The uniform mixture of starch, non-volatile inorganic acid, and water soluble amide can be obtained in various manners, e.g., by intimately mixing moist starch (moisture content about 35–40%) with liquid or powdered acid or amide, or by spraying aqueous solutions of the acid and the amide onto the air-dry starch. Alternatively the starch may be suspended in an aqueous solution of acid and amide, and after stirring collecting the starch on a suction filter. In all cases a mixture of moist starch and absorbed acid and amide is obtained, which can be adjusted to a moisture content below 12% by drying, for example in a pneumatic drier. Drying is preferably continued to a moisture content of not more than 8%, whereafter a substance which increases the mobility of the mixture, such as the above-mentioned tricalcium phosphate, magnesium oxide, or colloidal silica, may be added to the mixture. Surprisingly, the presence of the acid and the amide does not adversely affect the fluidizability of the starch, although the mobility of the starch is reduced by the addition of these substances.

The predried mixture is subsequently fluidized in a suitable apparatus, and heated in the fluidized state. The preferred fluidization gas is air, supplied at a velocity of about 0.5–20 cm./sec. Other suitable gases are, for example, nitrogen or carbon dioxide. Mixtures of air and these gases may also be used. Even when air is used, there is no risk of explosion.

Depending on the construction of the apparatus various types of fluidization are produced. If the gas is fed uniformly throughout the column, for example, by using a porous plate, a homogeneous fluidization is obtained (FIGURE 1). If the gas is supplied centrally into a column provided with a conical bottom (FIGURE 2), a channel is formed in the centre and the concentration of the solid is not uniform throughout (spouted bed). Both types of fluidization are suitable for the process according to the invention. The heat may be supplied to the fluidized bed by internal heat exchangers (FIGURE 1), by external heat exchangers (FIGURE 2), or by a combination of both. Heat may also be supplied to the fluidized material by the fluidizing gas, but it is preferred to use heat exchangers as this will allow a rapid, uniform and easily controllable heating, whereby products of excellent and uniform properties are obtained.

The treatment of the fluidized starch may be carried out as a batch process or as a continuous process. In the latter case the mixture of starch, acid and amide is continuously supplied to and withdrawn from the fluidized bed.

The fluidized mixture of starch, acid, and amide is heated to a temperature of from 80° to 200° C. At temperatures below 80° C., the rate of hydrolysis is insufficient, and at temperatures upwards of 200° C. there is a risk for the starch to be charred. Depending on the desired degree of hydrolysis, the reaction period may vary from a few minutes at 200° C. to 24 hours and more at 80° C. The preferred operating temperature ranges from 110° C. to 140° C., the mass being first slowly warmed up to allow the moisture present to be evaporated.

In this preferred temperature range the reaction is completed in a reasonable period of time, ranging from 30 minutes to 3 hours. The heating treatment generally produces a considerable hydrolysis, whereby thin-boiling products are formed. However, at temperatures above 120° C. a second reaction of unknown nature occurs, in which the starch molecules are cross-linked. Since the viscosity of starch increases when cross-bonds are formed, the viscosity reduction through hydrolysis is counteracted by the viscosity increase through cross-bonding. In the classical heating methods in pans and drums, there will generally be some local overheating of the starch whereby locally temperatures will occur at which cross linking proceeds. This is no doubt one of the reasons why the result of the hydrolysis in this classical equipment is poorly reproducible. In the method according to the present invention, the heating of the individual particles is very uniform, which eliminates local overheating and concomitant cross-linking. The performance of the reaction in the fluidized state results in the formation of unexpectedly superior products of uniform, low viscosity, which can not be obtained by conventional manufacturing processes.

The resulting hydrolyzed starches are lightly-coloured, homogeneous products which contain no black dots caused by local burning. The starch granules have maintained their structure and still show the polarization cross between crossed Nicols. The products can be dissolved in water at lower temperatures than the starch product used as the starting material. The pH of the heated solution is approximately neutral although a suspension of the products in cold water shows an acid reaction. The solutions are clear, lightly-coloured, and markedly stable, i.e., they remain transparent and liquid when allowed to stand for a long time. In contrast to the conventional starch hydrolysis porducts, the products obtained according to the invention are substantially non-reducing, when tested with Fehling's reagent for reducing carbohydrates. This absence of reducing end-groups is of advantage in several applications. The degree of hydrolysis (which may be effectively reproduced) is preferably chosen such that a viscosity of a 25% solution in water is between 10 and 1200 cp. By drying the solution flexible films are produced, which are excellently soluble in cold water. When the hydrolysis product is dried in the presence of an aldehyde water-insoluble films are produced, even at a neutral or weakly alkaline pH. Suitable aldehydes are, for example, formaldehyde, glyoxal, polyacrolein and dialdehyde starch. The hydrolysis products, particularly those prepared by means of phosphoric acids, may also be insolubilized by the addition of polyvalent metal salts, such as aluminum sulphate, basic aluminum chloride or zirconyl ammonium carbonate.

The products according to the present invention may be used for various purposes in the paper making industry, for example, they are suitable for surface sizing, coating, or gumming paper. In the textile industry, they can be advantageously used for sizing yarns and fabrics and in the foundry industry as core binders. Furthermore, the hydrolyzed starch products according to the invention may be used for adhesive and thickening purposes.

The invention will be illustrated in and by the following examples, in which the parts are parts by weight.

EXAMPLE 1

600 parts of potato starch containing 35% of moisture are intimately mixed with 50 parts of 89% phosphoric acid and 120 parts of urea. The moist mixture is dried in a vacuum drier down to a moisture content of 7%, and mixed with 0.5% tricalcium phosphate. The resulting powdered mixture is introduced into a fluidization device of the type illustrated in FIGURE 1, and fluidized by means of air. The temperature of the fluidized starch is slowly increased to 125° C. and maintained at this value for 1 hour.

In this manner, a light-yellow, granular product is obtained.

1 part of this product, boiled with 3 parts of water, produces a transparent cohesive paste which when allowed to stand for 24 hours remains clear and does not become thicker. The hydrolized starch does not reduce a solution of Fehling's test reagent. Similar products are obtained from waxy maize, oxidized potato starch, hydroxyethyl wheat starch, or acetylated tapioca starch.

EXAMPLE 2

400 parts of maize starch are suspended in 600 parts of water, in which are dissolved 18 parts of sulphamic acid and 72 parts of urea. The suspension is stirred for 1 hour at room temperature and filtered. The moist filter cake is dried to a moisture content of 4% and mixed with 0.1% colloidal silica. The powdered mixture is fluidized by means of air in an apparatus as illustrated in FIGURE 2. It is heated for 3 hours at a temperature of 150° C. There is thus obtained a light-brown product in which the granular form is maintained. When slightly heated, 1 part of the resulting product dissolves in 4 parts of water to form a medium viscous, transparent paste, which shows no set-back.

EXAMPLE 3

500 parts of tapioca starch are intimately mixed with a solution of 26 parts of 10 N sulphuric acid and 75 parts of urea in 100 parts of water. The moist mixture is dried to a moisture content of 5% and mixed with 0.2% tricalcium phosphate. By means of gaseous nitrogen, the dry powder is fluidized in a device of the type shown in FIGURE 2. The starch is heated to 125° C. and maintained at this temperature for 1 hour.

The final product is a lightly-coloured, granular, hydrolized starch. When 1 part of this product is boiled with 2 parts of water, a transparent, cohesive, practically neutral paste (pH=6.1), is obtained which does not change when left standing for several days.

I claim:
1. A process for hydrolyzing starch which comprises heating natural starch or granular modified starch, which has been impregnated with 0.5–20% (calculated on the starch) of a non-volatile inorganic acid and 5–50% (calculated on the starch) of a water-soluble amide, the resulting mixture containing no more than 12% of water, at a temperature ranging from 80° to 200° C., while the mixture is kept in the fluidized state by passing a stream of gas through a bed of the mixture at a velocity capable of fluidizing the starch granules.

2. A process according to claim 1 in which at least part of the heat is supplied to the fluidized mixture by means of heat exchangers.

3. A process according to claim 1 in which the mixture is heated at a temperature of about 110° to about 140° C.

4. A process according to claim 1 in which the mixture is heated at a temperature of about 110° to about 140° C. for about 0.5 to about 3 hours.

5. A process according to claim 1 in which the mixture contains from about 5 to about 15% of an acid selected from the group consisting of phosphoric acid, pyrophosphoric acid and polyphosphoric acid, calculated on the weight of the starch.

6. A process according to claim 1 in which the mixture contains from about 2 to about 8% of sulfamic acid based on the weight of the starch.

7. A process according to claim 1 in which the mixture contains from about 0.5 to about 3% of sulfuric acid based on the weight of the starch.

8. A process according to claim 1 in which the amide is urea, in an amount of from about 5 to about 25% based on the weight of the starch.

9. A process according to claim 1 in which the amide is formamide.

10. A process according to claim 1, in which the amide is acrylamide.

11. A process according to claim 1, in which the fluidizing gas has a linear velocity of from about 0.5 to about 20 cm./sec.

12. A process according to claim 1, in which the fluidizing gas is selected from the group consisting of air, nitrogen and carbon dioxide.

13. A process according to claim 1, in which the fluidizing gas is fed through a porous plate, for producing a uniform fluidization.

14. A process according to claim 1, in which the fluidizing gas is supplied centrally through a conical bottom for producing a non-uniform fluidization.

15. A process according to claim 1, in which the heat is supplied by means of internal heat exchangers in the bed.

16. A process according to claim 1, in which the heat is supplied by means of external heat exchangers around the bed.

17. A process according to claim 1, in which the fluidizability of the mixture is enhanced by the addition of from about 0.1 to about 2% of a substance selected from the group consisting of colloidal silica, magnesium oxide and tricalcium phosphate.

18. A process according to claim 1, in which the starch is hydrolyzed to such an extent, that the viscosity of a 25% aqueous solution is from about 10 to about 1200 cp.

References Cited

UNITED STATES PATENTS

| | | | |
|---|---|---|---|
| 2,127,205 | 8/1938 | Clegg et al. | 127—38 |
| 2,765,244 | 10/1956 | Stacey et al. | 127—36 |
| 2,770,562 | 11/1956 | Fetzer | 127—38 X |
| 2,789,066 | 4/1957 | Novak | 127—36 |
| 3,169,083 | 2/1965 | Taylor | 127—36 X |

FOREIGN PATENTS

| | | |
|---|---|---|
| 659,269 | 5/1965 | Belgium. |

OTHER REFERENCES

Ravindram: "Chemistry and Technology of Starch Hydrolysis," Chem. Absts. 64:2267a (1966).

Ravindram et al.: "Kinetics of Depolymerization of Fine Powders of Starch in Fluidized Beds," Chem. Absts. 60:5726b (1964).

MORRIS O. WOLK, Primary Examiner

D. G. CONLON, Assistant Examiner

U.S. Cl. X.R.
127—23, 36